US011143779B2

(12) United States Patent
Ewe et al.

(10) Patent No.: US 11,143,779 B2
(45) Date of Patent: Oct. 12, 2021

(54) DECONVOLUTION-BASED ENHANCEMENT OF APPARENT RESISTIVITY AND BED BOUNDARY IDENTIFICATION IN BOREHOLE RESISTIVITY IMAGING

(71) Applicant: Halliburton Energy Services, Inc., Houston, TX (US)

(72) Inventors: Wei-Bin Ewe, Singapore (SG); Ahmed Elsayed Fouda, Spring, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

(21) Appl. No.: 16/346,046

(22) PCT Filed: Apr. 16, 2018

(86) PCT No.: PCT/US2018/027795
§ 371 (c)(1),
(2) Date: Apr. 29, 2019

(87) PCT Pub. No.: WO2019/203791
PCT Pub. Date: Oct. 24, 2019

(65) Prior Publication Data
US 2020/0209425 A1  Jul. 2, 2020

(51) Int. Cl.
*G01V 3/20* (2006.01)
*E21B 47/13* (2012.01)
(Continued)

(52) U.S. Cl.
CPC .............. *G01V 3/20* (2013.01); *E21B 47/13* (2020.05); *G01V 3/38* (2013.01); *G01V 99/005* (2013.01); *E21B 23/14* (2013.01)

(58) Field of Classification Search
CPC .......... G01V 3/20; G01V 3/38; G01V 99/005; G01V 3/21; E21B 47/13; E21B 23/14
See application file for complete search history.

(56) References Cited

U.S. PATENT DOCUMENTS 3,060,373 A  10/1962  Doll
3,132,298 A   5/1964  Doll et al.
(Continued)

FOREIGN PATENT DOCUMENTS

CA     685727    5/1964
EP    0475715    3/1992
(Continued)

OTHER PUBLICATIONS

ISRWO International Search Report and Written Opinion for PCT/US2018/027795 dated Jan. 15, 2019.
(Continued)

*Primary Examiner* — Daniel R Miller
*Assistant Examiner* — Christian T Bryant
(74) *Attorney, Agent, or Firm* — John Wustenberg; C. Tumey Law Group PLLC

(57) ABSTRACT

A method and system for locating one or more bed boundaries. A method for locating one or more bed boundaries may include disposing a downhole tool into a wellbore, measuring wellbore wall resistivity with the downhole tool, extracting a vertical voltage measurement, deconvolving the vertical voltage measurement with an impulse response an apparent resistivity, and calculating a derivative of the apparent resistivity and finding one or more peaks of the derivative to determine the locations of the one or more bed boundaries. A well measurement system for locating one or more bed boundaries may include a downhole tool. The downhole tool may include a pad, an arm, a receiver disposed on the pad, and a transmitter disposed on the pad. The well measurement system may further comprise a conveyance and an information handling system.

20 Claims, 6 Drawing Sheets

(51) Int. Cl.
*G01V 3/38* (2006.01)
*G01V 99/00* (2009.01)
*E21B 23/14* (2006.01)

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 5,184,079 | A * | 2/1993 | Barber .................... G01V 3/28 324/339 |
| 5,377,105 | A * | 12/1994 | Smith .................... G01V 5/104 702/12 |
| 5,867,806 | A * | 2/1999 | Strickland ................ G01V 3/38 702/7 |
| 6,084,826 | A * | 7/2000 | Leggett, III ............ E21B 44/00 367/82 |
| 6,191,588 | B1 | 2/2001 | Chen |
| 6,253,155 | B1 * | 6/2001 | Hagiwara ................ G01V 1/48 702/9 |
| 6,430,509 | B1 | 8/2002 | Yin et al. |
| 7,012,426 | B2 | 3/2006 | Edwards et al. |
| 7,313,479 | B2 | 12/2007 | Frenkel |
| 7,555,390 | B2 | 6/2009 | Ramakrishnan |
| 7,565,833 | B2 | 7/2009 | Gillen et al. |
| 7,599,825 | B2 | 10/2009 | Yang et al. |
| 7,647,182 | B2 | 1/2010 | Hassan et al. |
| 7,756,641 | B2 | 7/2010 | Donadille et al. |
| 7,797,111 | B2 | 9/2010 | Forgang et al. |
| 7,804,302 | B2 | 9/2010 | Forgang et al. |
| RE42,493 | E | 6/2011 | Tabarovsky et al. |
| 8,008,919 | B2 | 8/2011 | Wang et al. |
| 8,417,456 | B2 | 4/2013 | Mauldin et al. |
| 8,579,037 | B2 | 11/2013 | Jacob |
| 8,886,483 | B2 | 11/2014 | Abubakar et al. |
| 9,037,415 | B2 | 5/2015 | Zhao |
| 9,429,668 | B2 | 8/2016 | Huo et al. |
| 9,482,776 | B2 | 11/2016 | Hagiwara |
| 2005/0083061 | A1 * | 4/2005 | Tabanou .................. G01V 3/28 324/334 |
| 2006/0161352 | A1 * | 7/2006 | Goswami ................ G01V 3/18 702/11 |
| 2008/0061225 | A1 | 3/2008 | Orban et al. |
| 2008/0079431 | A1 * | 4/2008 | Dashevsky .............. G01V 3/28 324/334 |
| 2012/0065889 | A1 | 3/2012 | Wu et al. |
| 2013/0027044 | A1 * | 1/2013 | Minerbo .................. G01V 3/28 324/343 |
| 2013/0030707 | A1 * | 1/2013 | Tabarovsky ............. G01V 3/24 702/11 |
| 2014/0216818 | A1 * | 8/2014 | Hagiwara ................ E21B 7/04 175/61 |

FOREIGN PATENT DOCUMENTS

| | | | | |
|---|---|---|---|---|
| WO | 9918454 | | 4/1999 | |
| WO | 2007008876 | | 1/2007 | |
| WO | 2017003517 | | 1/2017 | |
| WO | WO-2017003517 | A1 * | 1/2017 | .............. G01V 1/36 |
| WO | 2017192124 | | 11/2017 | |
| WO | 2019177588 | | 9/2019 | |

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.

\* cited by examiner

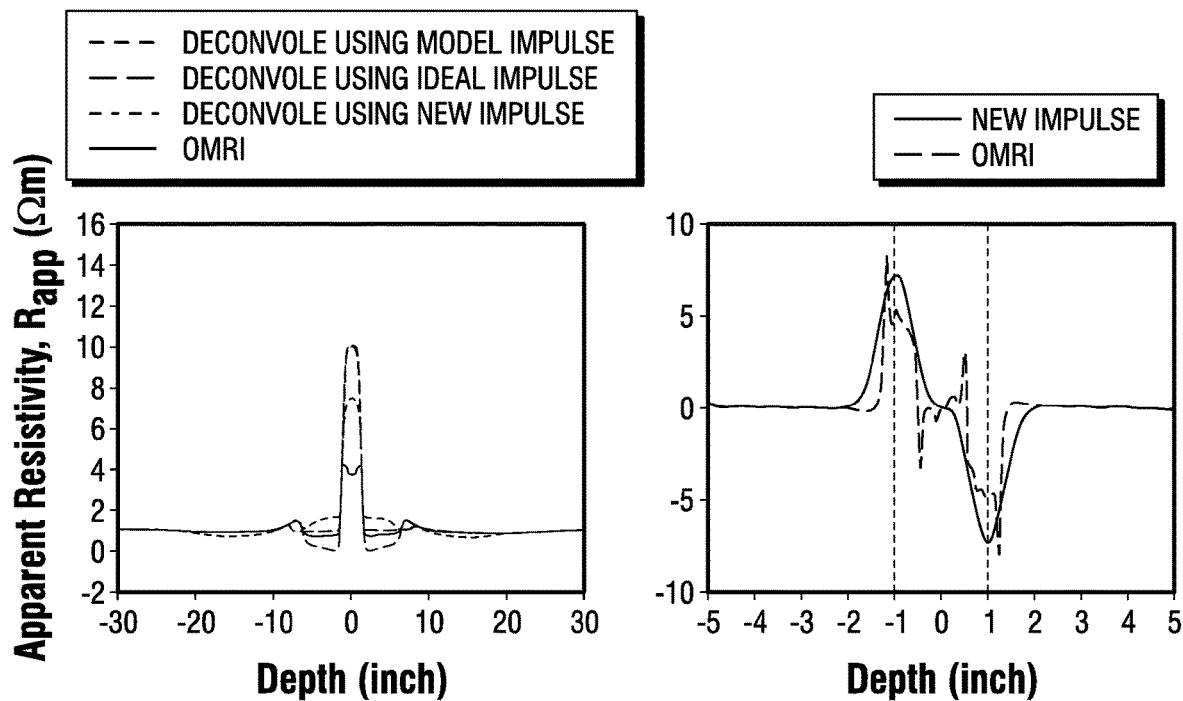
FIG. 6A
FIG. 6B
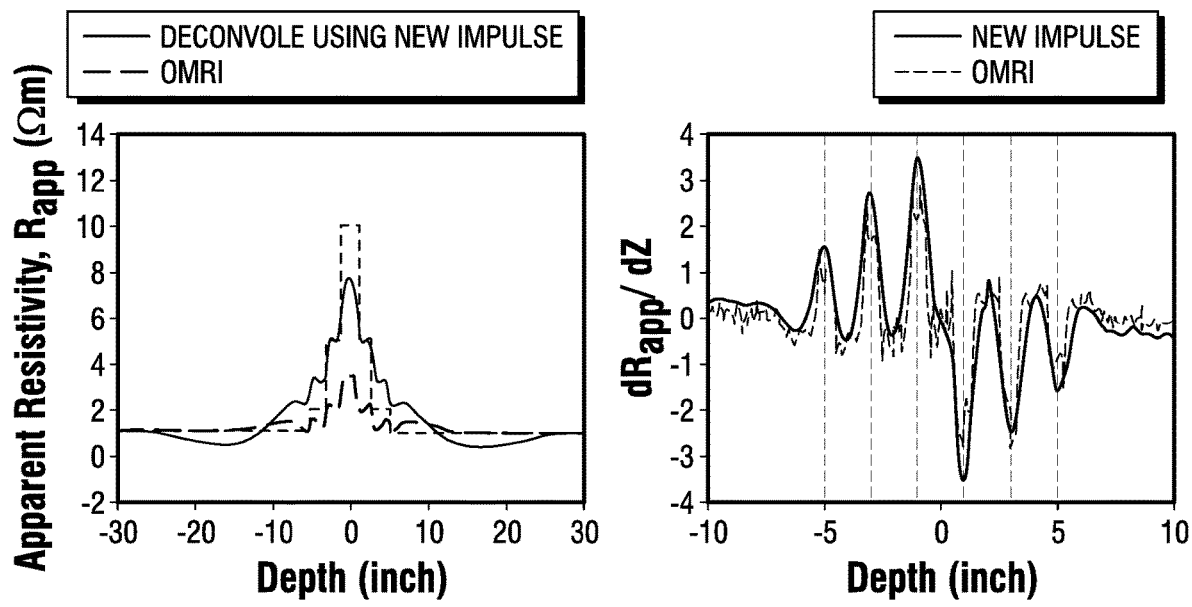
FIG. 7A
FIG. 7B

DECONVOLUTION-BASED ENHANCEMENT OF APPARENT RESISTIVITY AND BED BOUNDARY IDENTIFICATION IN BOREHOLE RESISTIVITY IMAGING

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. As wellbores get deeper, logging tools may become longer and more sophisticated. Measurements by logging tool may provide inaccurate information that may not allow an operator to determine wellbore and/or formation properties. This may greatly complicate the relation between raw responses and formation properties, and lead to inaccurate interpretation from recordings, which may skew results of wellbore and formation properties. Specifically, the location of bed boundaries within a formation. Beds are individual rock layers that collectively form rock strata. Where two individual beds meet, a bed boundary is formed. Determining the location and thickness of individual beds and boundaries between beds may affect work performed within a wellbore at bed boundaries.

BRIEF DESCRIPTION OF THE DRAWINGS

These drawings illustrate certain aspects of some examples of the present disclosure, and should not be used to limit or define the disclosure.

FIGS. 6a and 6b illustrate graphs of resistivity vs depth;

FIGS. 7a and 7b illustrate graphs of resistivity vs depth; and

DETAILED DESCRIPTION

This disclosure generally relates to explorations for hydrocarbons involving investigations of regions of an earth formation that may be penetrated by a borehole. More specifically, the invention deals with the problem of accurately locating and defining bed boundaries within a formation.

Figure 1:
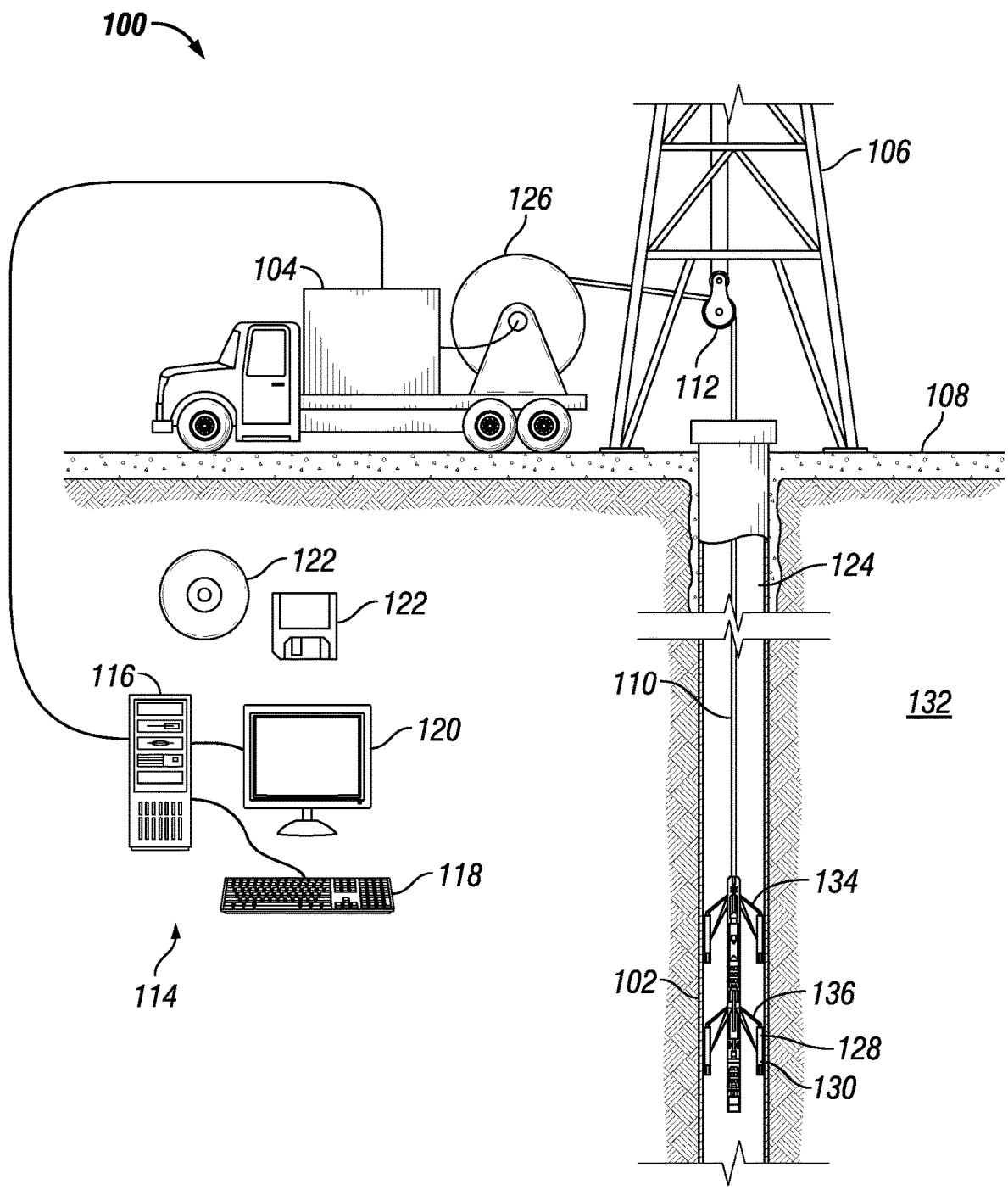
FIG. 1 illustrates an example of a well measurement system.

FIG. 1 illustrates a cross-sectional view of a well measurement system 100. As illustrated, well measurement system 100 may include downhole tool 102 attached a vehicle 104. It should be noted that downhole tool 102 illustrates a specific downhole device for representative purposes and any downhole device may be utilize the methods and systems described below. In examples, downhole tool 102 may not be attached to a vehicle 104. Downhole tool 102 may be supported by rig 106 at surface 108. Downhole tool 102 may be tethered to vehicle 104 through conveyance 110. Conveyance 110 may include any suitable means for providing mechanical conveyance for downhole tool 102, including, but not limited to, wireline, slickline, coiled tubing, pipe, drill pipe, downhole tractor, or the like.

In one or more embodiments, conveyance 110 may be disposed around one or more sheave wheels 112 to vehicle 104. In some embodiments, conveyance 110 may provide electrical connectivity, as well as mechanical suspension, for downhole tool 102. Conveyance 110 may include, in some instances, a plurality of electrical conductors extending from vehicle 104. The electrical conductors may be used for communicating power and telemetry between vehicle 104 and downhole tool 102. For example, conveyance 110 may include an inner core of seven electrical conductors covered by an insulating wrap. Optionally, an inner and outer steel armor sheath may be wrapped in a helix in opposite directions around the conductors.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from wellbore 124. In examples, information handling system 114 may be disposed downhole. Downhole information handling system may be disposed on downhole tool 102. In examples, downhole information handling system 114 may control and/or power downhole tool 102. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes.

For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components. In examples, information handling system 114 may be disposed downhole on downhole device 102 or on surface 108, as illustrated in FIG. 1. Additionally, there may be at least one information handling system 114 disposed downhole on downhole device 102 and on surface 108. This may allow for processing, recording, measuring, etc. to be at least be performed downhole or on surface 108 between two different information handling systems 114. It should be noted that some processing, recording, measuring, etc. may be split between information handling systems 114 that may be disposed both on surface 108 and downhole.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

As discussed below, methods may be utilized by information handling system 114 to produce boundaries of subsurface structures, such as a plurality of layers disposed in formation 132. An image may be generated that illustrates the different layers and boundaries of formation 132. These models may be used for well planning, (i.e. to design a desired path of wellbore 124 (Referring to FIG. 1)). Additionally, they may be used for planning the placement of drilling systems within a prescribed area. This may allow for the most efficient drilling operations to reach a subsurface structure. During drilling operations, measurements taken within wellbore 124 may be used to adjust the geometry of wellbore 124.

Downhole tool 102 may include a transmitter 128 and/or a receiver 130. Transmitter 128 and/or receiver 130 may be disposed on at least one pad 134 in any suitable order. For example, a pad 134 may include only transmitters 128 and/or receivers 130. Further, a pad 134 may include both transmitter 128 and receivers 130. Pads 134 may be attached to at least one arm 136 that may extend from downhole tool 102. Arm 136 may place pad 134 in contact with wellbore 124. It should be noted that there may be a plurality of arms 136. One or more arms 136 may place an arrangement of transmitters 128 and/or receiver 130 in close proximity to the wall of wellbore 124.

In examples, downhole tool 102 may operate with additional equipment (not illustrated) on surface 108 and/or disposed in a separate well measurement system (not illustrated) to record measurements and/or values from formation 132. During operations, transmitter 128 may broadcast a signal from downhole tool 102. Transmitter 128 may be connected to information handling system 114, which may further control the operation of transmitter 128. Additionally, receiver 130 may measure and/or record signals broadcasted from transmitter 128. Receiver 130 may transfer recorded information to information handling system 114. Information handling system 114 may control the operation of receiver 130. For example, the broadcasted signal from transmitter 128 may be reflected by formation 132. The reflected signal may be recorded by receiver 130. The recorded signal may be transferred to information handling system 114 for further processing. In examples, there may be any suitable number of transmitters 128 and/or receivers 130, which may be controlled by information handling system 114. Information and/or measurements may be processed further by information handling system 114 to determine properties of wellbore 124, fluids, and/or formation 132.

Figure 2:
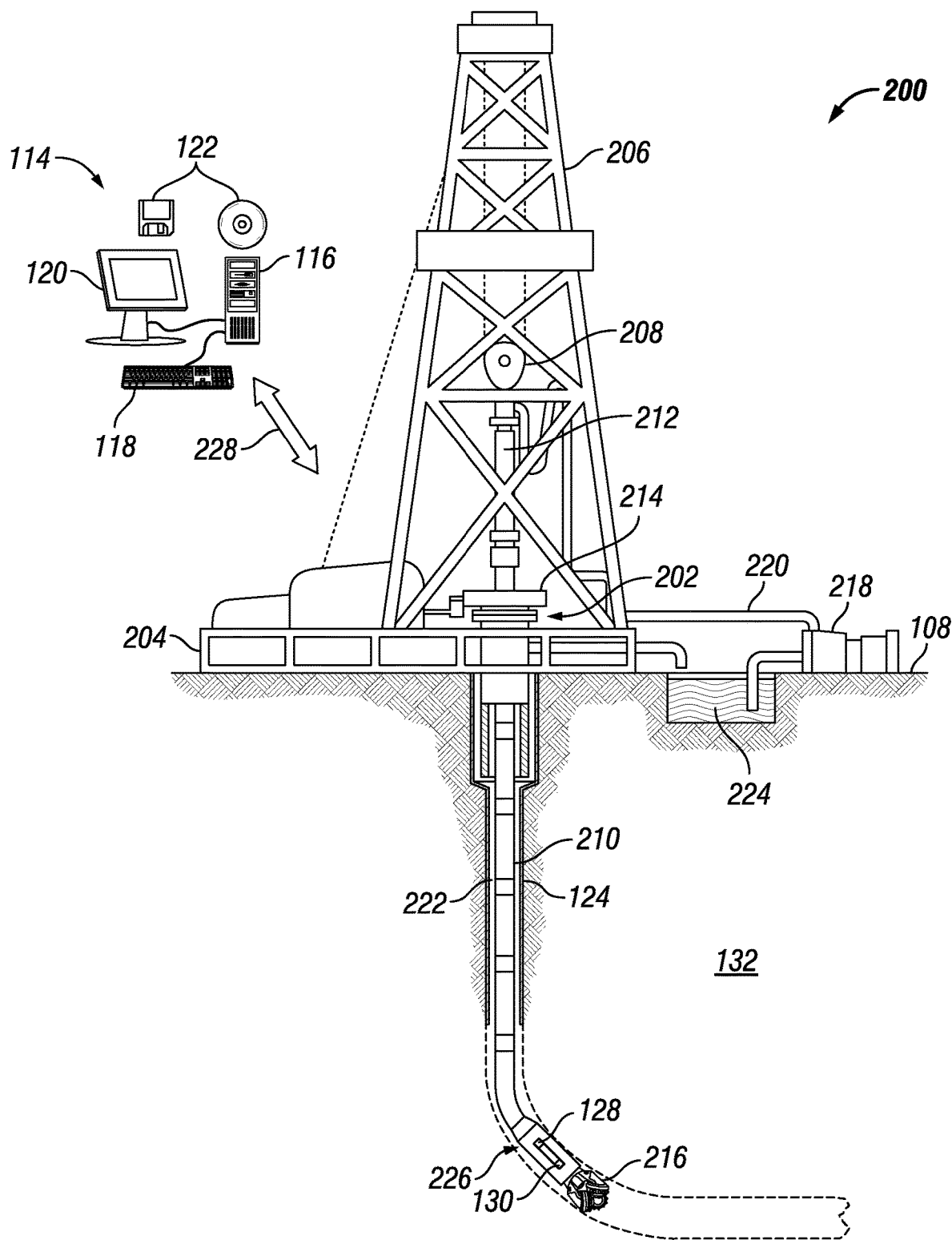
FIG. 2 is an illustration of an example drilling system including a bottom hole assembly.

FIG. 2 illustrates a drilling system 200. As illustrated, wellbore 124 may extend from a wellhead 204 into a subterranean formation 132 from a surface 108. Generally, wellbore 124 may include horizontal, vertical, slanted, curved, and other types of wellbore geometries and orientations. Wellbore 124 may be cased or uncased. In examples, wellbore 124 and may include a metallic material. By way of example, the metallic member may be a casing, liner, tubing, or other elongated steel tubular disposed in wellbore 124.

As illustrated, wellbore 124 may extend through subterranean formation 132. As illustrated in FIG. 2, wellbore 124 may extending generally vertically into the subterranean formation 132, however wellbore 124 may extend at an angle through subterranean formation 132, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 204 may support a derrick 206 having a traveling block 208 for raising and lowering drill string 210. Drill string 210 may include drill pipe and coiled tubing, as generally known to those skilled in the art. A kelly 212 may support drill string 210 as it may be lowered through a rotary table 214. A drill bit 216 may be attached to the distal end of drill string 210 and may be driven either by a downhole motor and/or via rotation of drill string 210 from surface 108. Without limitation, drill bit 216 may include, roller cone bits, PDC bits, natural diamond bits, any hole openers, reamers, coring bits, and the like. As drill bit 210 rotates, it may create and extend wellbore 124 that penetrates various subterranean formations 132. A pump 218 may circulate drilling fluid through a feed pipe 220 to kelly 212, downhole through interior of drill string 210, through orifices in drill bit 216, back to surface 108 via annulus 222 surrounding drill string 210, and into a retention pit 224.

With continued reference to FIG. 2, drill string 210 may begin at wellhead 202 and may traverse wellbore 124. Drill bit 216 may be attached to a distal end of drill string 210 and may be driven, for example, either by a downhole motor and/or via rotation of drill string 210 from surface 108. Drill bit 216 may be a part of bottom hole assembly 226 at distal end of drill string 210. Bottom hole assembly 226 may further include a transmitter 128 and/or a receiver 130. As will be appreciated by those of ordinary skill in the art, bottom hole assembly 226 may be a measurement-while drilling (MWD) or logging-while-drilling (LWD) system.

Without limitation, bottom hole assembly 226 may be connected to and/or controlled by information handling system 114, which may be disposed on surface 108. Without limitation, information handling system 114 may be disposed down hole in bottom hole assembly 226. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 226 may be brought to surface 108. In examples, information handling system 114 may communicate with bottom hole assembly 226 through a communication line (not illustrated) disposed in (or on) drill string 120. In examples, wireless communication may be used to transmit information back and forth between information handling system 114 and bottom hole assembly 226. Information handling system 114 may transmit information to bottom hole assembly 226 and may receive as well as process information recorded by bottom hole assembly 226. In examples, a downhole information handling system (not illustrated) may include, without limitation, a microprocessor or other suitable circuitry, for estimating, receiving and processing signals from bottom hole assembly 226. Downhole information handling system (not illustrated) may further include additional components, such as memory, input/output devices, interfaces, and the like. In examples, while not illustrated, bottom hole assembly 226 may include one or more additional components, such as analog-to-digital converter, filter and amplifier, among others, that may be used to process the measurements of bottom hole assembly 226 before they may be transmitted to surface 108. Alternatively, raw measurements from bottom hole assembly 226 may be transmitted to surface 108.

Any suitable technique may be used for transmitting signals from bottom hole assembly 226 to surface 108, including, but not limited to, wired pipe telemetry, mud-pulse telemetry, acoustic telemetry, and electromagnetic telemetry. While not illustrated, bottom hole assembly 226 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 228, which may be a wired or wireless link. The telemetry data may be analyzed and processed by information handling system 114.

As illustrated, communication link 228 (which may be wired or wireless, for example) may be provided that may transmit data from bottom hole assembly 226 to an information handling system 114 at surface 108. Information handling system 114 may include a processing unit 116, a monitor 120, an input device 118 (e.g., keyboard, mouse, etc.), and/or computer media 122 (e.g., optical disks, magnetic disks) that may store code representative of the methods described herein. In addition to, or in place of processing at surface 108, processing may occur downhole.

Figure 3:
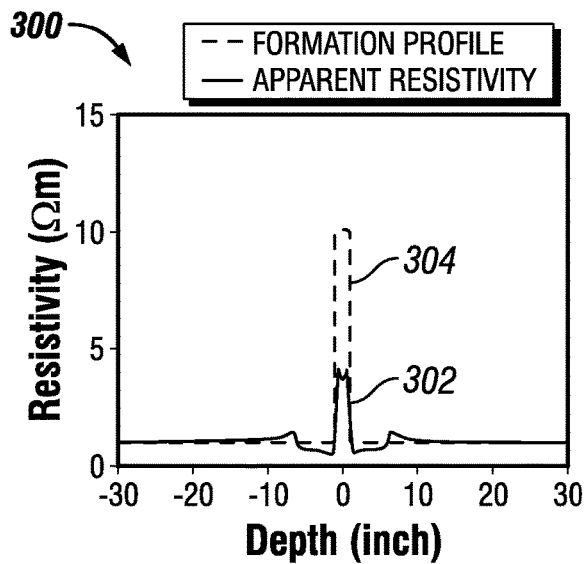
FIG. 3 illustrates a graph of resistivity vs depth.

FIG. 3 illustrates a logging response 300 from downhole tool 102 in wellbore 124 (referring to FIG. 1). Logging response 300 illustrates a resistivity measurement of formation 132 (referring to FIG. 1). Specifically, logging response 300 is of a formation profile including a first layer, a second layer, and a third layer, which may include three horizontal layers. The second layer may include a two inch thick horizontal bed with a resistivity of about 10 nanometers (nm) and adjacent layers of the first layer and third layer. The first layer and the third layer may be in the background with a resistivity of about 1 nm. During logging operations, downhole tool 102 may multiply the measured voltages at a button electrode with tool constants to obtain an apparent resistivity of the wall of wellbore 124. As illustrated in logging response 300, apparent resistivity 302 of the middle layer obtained from downhole tool 102 may be less than half of the actual formation profile. Additionally, the bed boundary of the second layer may be off from the actual position.

Figure 4A:
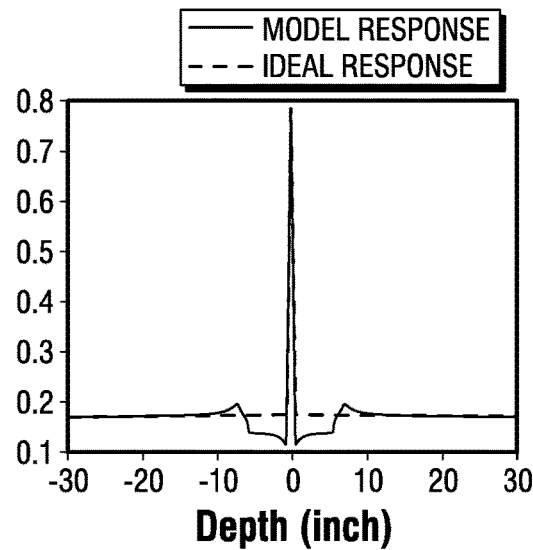
FIGS. 4a-4c illustrate graphs of resistivity vs depth.
Figure 4B:
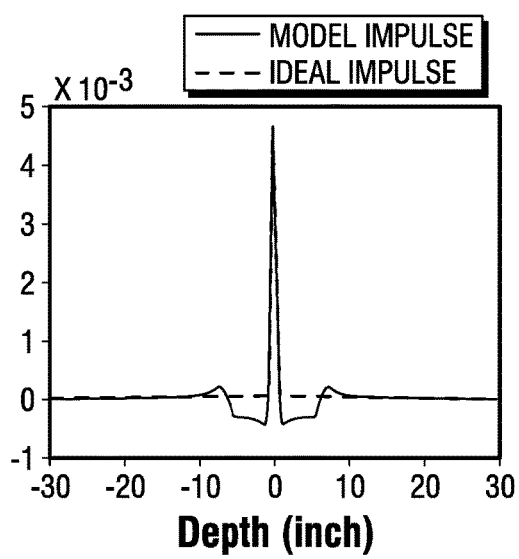
Figure 4C:
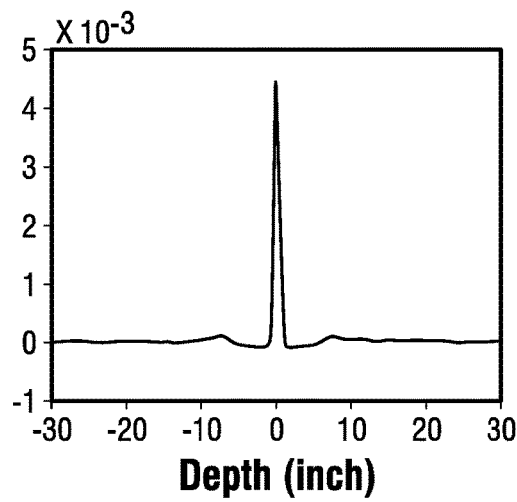

As disclosed below, a deconvolution method may be utilized to improve the quality of a resistivity image from logging response 300 (referring to FIG. 5). In order to use the deconvolution method, a suitable impulse response is needed to deconvolve the measured resistivity signal. FIGS. 4a-4c illustrate the construction of the proposed impulse response. FIG. 4a illustrates a modeled responses of a 0.5 inch (0.1 meter) thin horizontal bed with a resistivity of about 10 nm. FIG. 6b illustrates the corresponding ideal impulse responses. FIG. 4c illustrates a new impulse response constructed by linearly combining the model impulse response in FIG. 4a and the ideal impulse response of FIG. 4b using a linear combination factor $\alpha$. For example, a suitable equation seen below:

$$\alpha(\text{Model impulse}) + (1-\alpha)(\text{Ideal impulse}) \quad (1)$$

which may produce the new impulse response as illustrated in FIG. 4c. In the example shown in FIG. 4c, $\alpha$ has been set equal to 0.45, but it may be further optimized for optimum performance.

Figure 5:
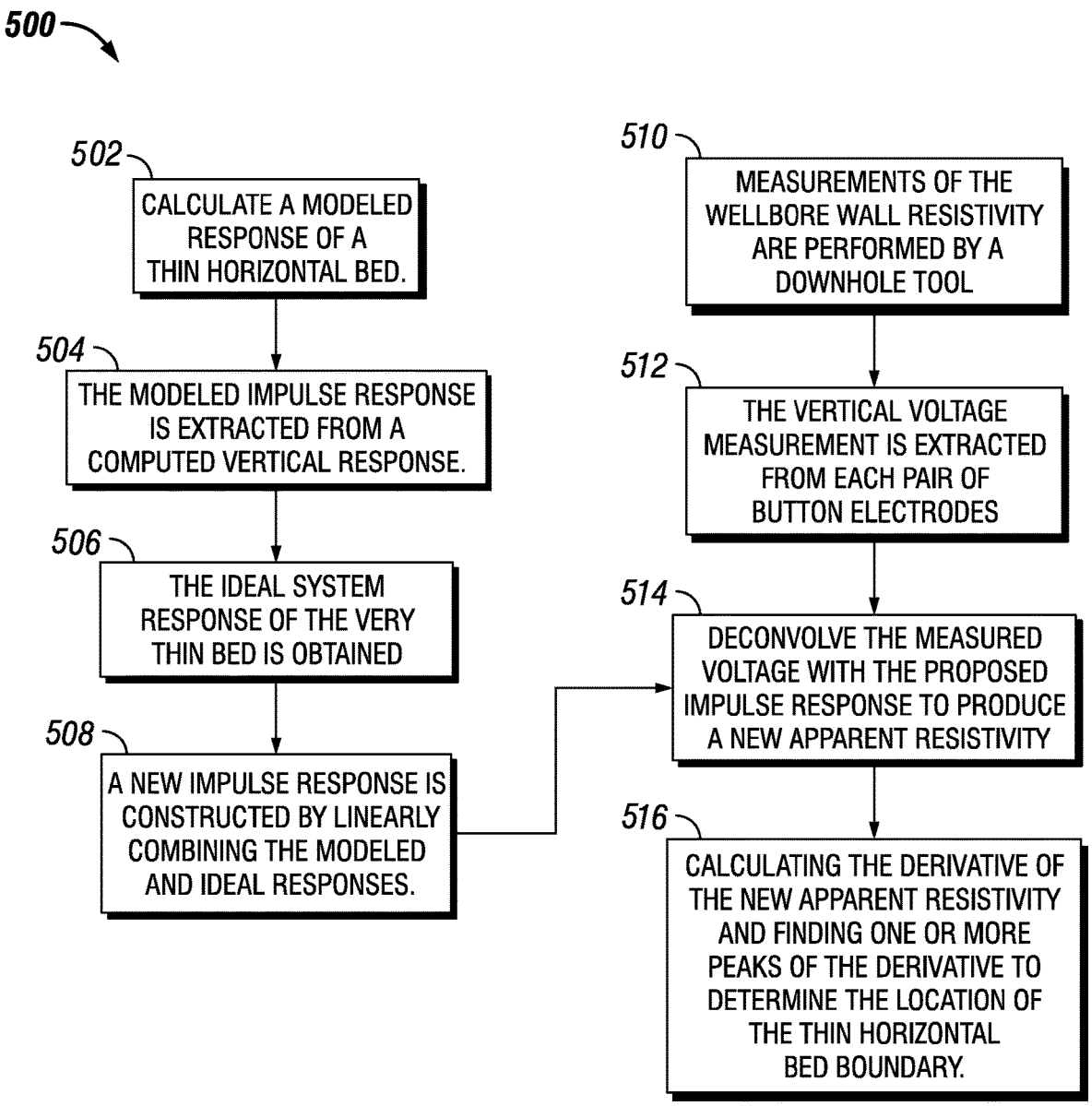
FIG. 5 illustrates a flow chart to determine apparent resistivity.

FIG. 5 shows the workflow of the proposed method to enhance the apparent resistivity measured by each pair of button electrodes. The blocks on the left show the steps to construct the new impulse response to be used in deconvolution. The blocks on the right show the steps to improve the resistivity images: the voltages measured by one pair of the button electrodes will be deconvolved using the new impulse response for improvement in apparent resistivity; then the derivative of the improved apparent resistivity will be calculated and the peaks will be used to determine the location of the bed boundary.

FIG. 5 illustrates a flow chart 500 for one dimensional ("1D") deconvolution for resistivity image enhancement. First step 502 may begin the method for 1D deconvolution for resistivity image enhancement. In first step 502, the step of calculating a modeled response of a thin horizontal bed may be performed. A thin horizontal bed may be defined as a rock formation that may not be identifiable due to its thickness by conventional tools and/or methods. In the next step, step 504, the modeled impulse response may be extracted from a computed vertical response. Then, in step 506, the ideal system response of the very thin horizontal bed may be obtained. In step 508, following step 506, a new impulse response may be constructed by linearly combining the modeled and ideal impulse response, as described above.

During the 1D deconvolution, steps 510 and 512 may be performed during and/or after steps 502 through 508. In step 510, measurements of the wellbore wall resistivity may be performed by downhole tool 102 (Referring to FIG. 1). From theses measurement, in step 512, the vertical voltage measurement may be extracted from each pair of button electrodes. An operator, in step 514, may then deconvolve the measured voltage with the proposed impulse response (from step 508) to produce a new apparent resistivity. Step 516 ends the 1D deconvolution by calculating the derivative of the new apparent resistivity and finding one or more peaks of the derivative to determine the location of the thin horizontal bed boundary.

FIGS. 6a and 6b illustrates the results of deconvolution, which may enhance a resistivity image. In FIG. 6a, the computed apparent resistivity obtained from the deconvolution by a new impulse response improved by approximately 88% at the center of the bed (depth=0). While in FIG. 6b, the peaks of the derivative of then new apparent resistivity have identified the actual location of the bed boundary at a depth of −1" (−0.025 meter) and 1" (0.025 meter).

FIGS. 7a and 7b illustrate the results of the proposed method on another example with five layers of horizontal beds embedded in a background medium with a resistivity of about 1.0 nm. The thicknesses of the beds may be about two inches (5 cm) and the resistivity of these beds, from left to right, is 2 nm, 5 nm, 10 nm, 5 nm, and 2 nm, respectively. While this example was performed with beds having a thickness of two inches (5 cm), it should be noted that the present techniques may be used with beds that are larger or smaller than two inches (5 cm) in thickness, including, but not limited to, a thickness ranging from 0.4 inch (1 cm) to about 10 feet (305 cm) or greater. In general, the computed apparent resistivity may improve the magnitude of downhole tool 102 (Referring to FIG. 1) as illustrated in FIG. 7a. Similar to the previous example, the peaks of the derivative of new apparent resistivity may correctly identify the actual location of six bed boundary as shown in FIG. 7b.

The enhancement method described in FIG. 5 may be also expanded to process two dimensional ("2D") resistivity image by constructing new 2D impulse response from the 2D model and ideal impulse responses. The workflow for the 2D image enhancement is shown in FIG. 8.

Figure 8:
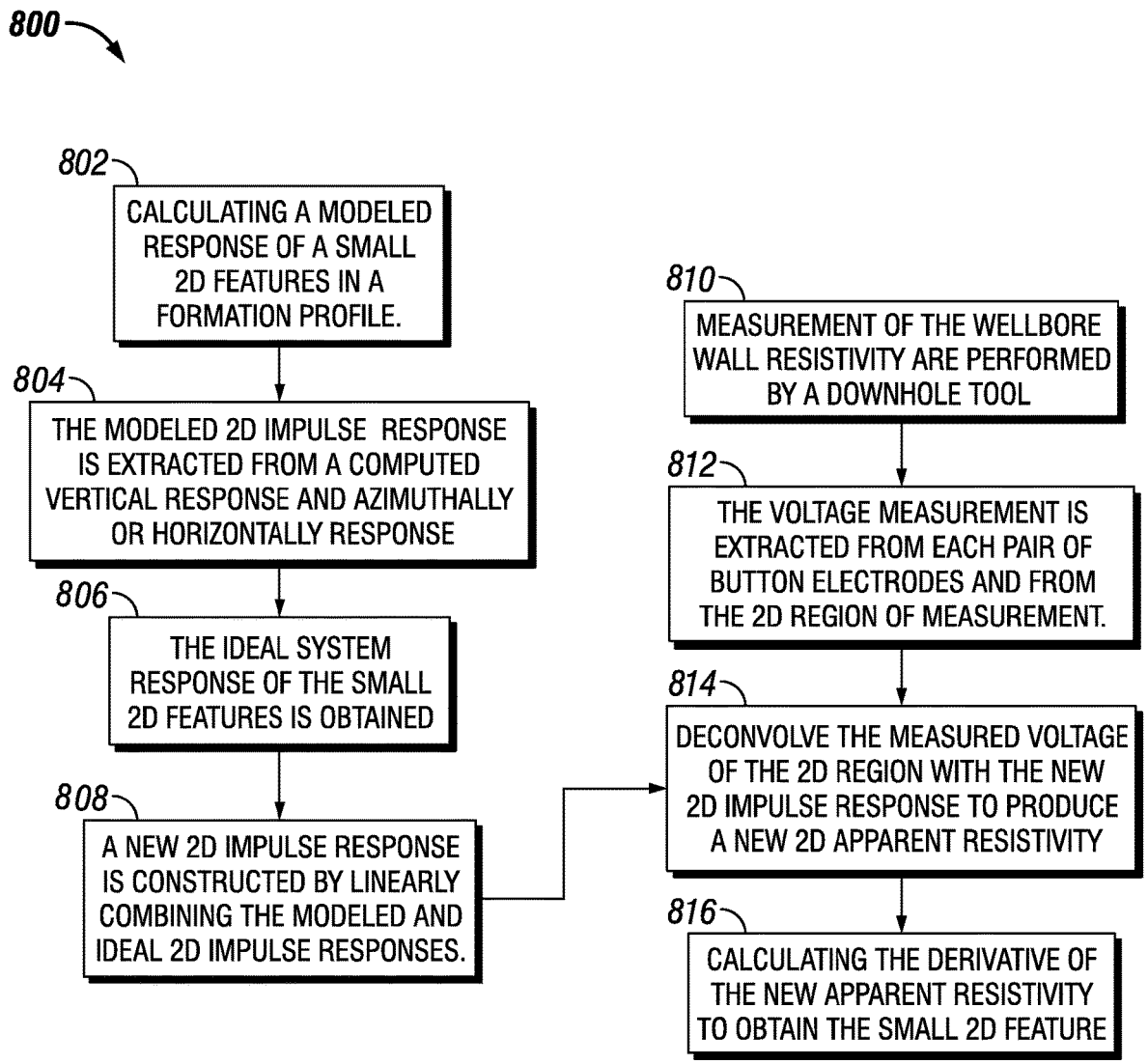
FIG. 8 illustrates a flow chart of determining a bed location.

FIG. 8 illustrates a flow chart 800 for 2D deconvolution for resistivity image enhancement. First step 802 may begin the method for 2D deconvolution for resistivity image enhancement. In first step 802, the step of calculating a modeled response of a small 2D features in a formation profile may be performed. In the next step, step 804, the modeled 2D impulse response may be extracted from a computed vertical response and azimuthal or horizontal response. Then, in step 806, the ideal system response of small 2D features may be obtained. In step 808, following step 806, a new 2D impulse response may be constructed by linearly combining the modeled and ideal 2D impulse responses, as described above.

During the 2D deconvolution, steps 810 and 812 may be performed during and/or after steps 802 through 808. In step 810, measurements of the wellbore wall resistivity may be performed by downhole tool 102 (Referring to FIG. 1). From theses measurement, in step 812, the voltage measurement may be extracted from each pair of button electrodes and from the 2D region of measurement. An operator, in step 814, may then deconvolve the measured voltage of the 2D region with the new 2D impulse response (from step 808) to produce a new 2D apparent resistivity. Step 816 ends the 2D deconvolution by calculating the derivative of the new apparent resistivity to obtain the location of the small 2D feature.

This method and system may include any of the various features of the compositions, methods, and systems disclosed herein, including one or more of the following statements.

Statement 1: A method for locating one or more bed boundaries with a downhole tool may comprise disposing a downhole tool into a wellbore, wherein the downhole tool comprises a transmitter and a receiver; broadcasting a signal from the transmitter; measuring wellbore wall resistivity with the receiver; extracting a vertical voltage measurement; deconvolving the vertical voltage measurement with an impulse response an apparent resistivity; calculating a derivative of the apparent resistivity and finding one or more peaks of the derivative; and identifying a location of the one or more bed boundaries.

Statement 2: The method of statement 1, may further comprise determining the impulse response, wherein the determining may comprise calculating a modeled response of a thin horizontal bed; extracting the modeled impulse response from a computed vertical response; obtaining an ideal system response of the thin horizontal bed; and constructing the impulse response through a process comprising linearly combining the modeled impulse response and the ideal system response.

Statement 3: The method of statement 1 or statement 2, may further comprise displaying the one or more bed boundaries and wherein an operator makes a production decision based on the one or more bed boundaries.

Statement 4: The method of any previous statement, may further comprise producing a formation data product comprising the one or more bed boundaries.

Statement 5: The method of any previous statement, may further comprise storing the formation data product on a non-transitory computer-readable media.

Statement 6: The method of any previous statement, wherein the deconvolving the vertical voltage measurement is in a two-dimensional plane.

Statement 7: The method of any previous statement, wherein the downhole tool may comprise at least one pad, at least one arm, and wherein at least one transmitter and at least one receiver are disposed on the at least one pad.

Statement 8: A well measurement system for locating one or more bed boundaries may comprise a downhole tool, wherein the downhole tool may comprise a pad; an arm, wherein the arm extends the pad from the downhole tool; a receiver disposed on the pad; and a transmitter disposed on the pad; a conveyance, wherein the conveyance is attached to the downhole tool; and an information handling system, wherein the information handling system is measure wellbore wall resistivity with the downhole tool; extract a vertical voltage measurement; deconvolve the vertical voltage measurement with an impulse response to obtain an apparent resistivity; and calculate a derivative of the apparent resistivity and find one or more peaks of the derivative to determine the locations of the one or more bed boundaries.

Statement 9: The system of statement 8, wherein the information system is configured to calculate a modeled response of a thin horizontal bed; extract the modeled impulse response from a computed vertical response; obtain an ideal system response of the thin horizontal bed; and construct the impulse response through a process comprising linearly combining the modeled impulse response and the ideal system response.

Statement 10: The system statement 8 or statement 9, wherein the information handling system is configured to display the locations of the one or more bed boundary Statement 11: The system of any statement 8-10, wherein the information handling system is configured to deconvolve the vertical voltage measurement in a two-dimensional plane.

Statement 12: The system of any one of statements 8-11, wherein the information handling system is configured to display the one or more bed boundaries.

Statement 13: The system of any one of statements 8-12, may further comprise producing a formation data product comprising the one or more bed boundaries.

Statement 14: The system of any one of statements 8-13, may further comprise storing the formation data product on a non-transitory computer-readable media.

Statement 15: An information handling system having instructions stored therein, wherein the instructions, when executed locate one or more bed boundaries in a two-dimensional plane may comprise calculating a two-dimensional modeled response of a thin horizontal bed in the two-dimensional plane; extracting the two-dimensional modeled impulse response from a computed vertical response and a azimuthal response; obtaining an two-dimensional ideal system response of the thin horizontal bed; and constructing a two-dimensional new impulse response through linearly combining the modeled impulse response and the ideal system response.

Statement 16: The method of statement 15, may further comprise disposing a downhole tool into a wellbore; measuring wellbore wall resistivity with the downhole tool; extracting a vertical voltage measurement; deconvolving the vertical voltage measurement of a two-dimensional region with the two-dimensional new impulse response; and calculating a derivative of a new apparent resistivity and finding a peak to determine the location of the bed boundary.

Statement 17: The method of statement 15 or statement 16, wherein an information handling system is configured to display the location of the bed boundary.

Statement 18: The method of any one of statements 15-17, may further comprise displaying the one or more bed boundaries and wherein an operator makes a production decision based on the one or more bed boundaries.

Statement 19: The method of any one of statements 15-18, may further comprise producing a formation data product comprising the bed boundaries.

Statement 20: The method of any one of statements 15-19, may further comprise storing the formation data product on a tangible, non-volatile computer-readable medium.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for locating one or more bed boundaries with a downhole tool comprising:
   disposing a downhole tool into a wellbore, wherein the downhole tool comprises a transmitter and a receiver;
   broadcasting a signal from the transmitter;
   measuring the signal response to obtain wellbore wall resistivity with the receiver;
   extracting a vertical voltage measurement from the wellbore wall resistivity;
   deconvolving the vertical voltage measurement with an impulse response to obtain an apparent resistivity;
   determining the impulse response, wherein the determining comprises:
   calculating a two-dimensional modeled response of a thin horizontal bed in the two-dimensional plane;
   obtaining a two-dimensional ideal system response of the thin horizontal bed; and
   constructing a two-dimensional impulse response through linearly combining the modeled impulse response and the ideal system response;
   calculating a derivative of the apparent resistivity and finding one or more peaks of the derivative; and
   identifying a location of the one or more bed boundaries based on at least one or more peaks of the derivative, apparent resistivity, or voltage response.

2. The method of claim 1, further comprising displaying the one or more bed boundaries and wherein an operator makes a production decision based on the one or more bed boundaries.

3. The method of claim 2, further comprising producing a formation data product comprising the one or more bed boundaries.

4. The method of claim 3, further comprising storing the formation data product on a non-transitory computer-readable media.

5. The method of claim 1, wherein the deconvolving the vertical voltage measurement is in a two-dimensional plane.

6. The method of claim 1, wherein the downhole tool comprises at least one pad, at least one arm, and wherein at least one transmitter and at least one receiver are disposed on the at least one pad.

7. A well measurement system for locating one or more bed boundaries comprising:
   a downhole tool, wherein the downhole tool comprises:
      a pad;
      an arm, wherein the arm extends the pad from the downhole tool;
      a receiver disposed on the pad; and
      a transmitter disposed on the pad;
   a conveyance, wherein the conveyance is attached to the downhole tool; and an information handling system, wherein the information handling system is configured to:
  measure wellbore wall resistivity with the downhole tool;
  extract a vertical voltage measurement from the wellbore wall resistivity;
  deconvolve the vertical voltage measurement with an impulse response to obtain an apparent resistivity;
  calculate a two-dimensional modeled response of a thin horizontal bed in the two-dimensional plane;
  obtain a two-dimensional ideal system response of the thin horizontal bed; and
  construct a two-dimensional impulse response through linearly combining the modeled impulse response and the ideal system response; and
  calculate a derivative of the apparent resistivity and find one or more peaks of the derivative to determine the locations of the one or more bed boundaries.

8. The well measurement system for locating bed boundaries of claim 7, wherein the information system is configured to calculate a modeled impulse response of a thin horizontal bed; extract the modeled impulse response from a computed vertical response; obtain an ideal system response of the thin horizontal bed; and construct the impulse response through a process comprising linearly combining the modeled impulse response and the ideal system response.

9. The well measurement system for locating bed boundaries of claim 7, wherein the information handling system is configured to display the locations of the one or more bed boundaries.

10. The well measurement system for locating bed boundaries of claim 7, wherein the information handling system is configured to deconvolve the vertical voltage measurement in a two-dimensional plane.

11. The well measurement system for locating bed boundaries of claim 7, wherein the information handling system is configured to display the one or more bed boundaries.

12. The well measurement system of claim 11, further comprising producing a formation data product comprising the one or more bed boundaries.

13. The well measurement system of claim 12, further comprising storing the formation data product on a non-transitory computer-readable media.

14. A method for locating one or more bed boundaries in a two-dimensional plane comprising:
  calculating a two-dimensional modeled impulse response of a thin horizontal bed in the two-dimensional plane;
  obtaining a two-dimensional ideal system response of the thin horizontal bed; and
  constructing a two-dimensional impulse response through linearly combining the modeled impulse response and the ideal system response; and
  determining the location of the one or more bed boundaries using the two-dimensional impulse response.

15. The method of claim 14 wherein determining the location of the one or more bed boundaries using the two-dimensional impulse response comprises:
  disposing a downhole tool into a wellbore;
  measuring the signal response to obtain wellbore wall resistivity with the downhole tool;
  extracting a vertical voltage measurement from the wellbore wall resistivity;
  deconvolving the vertical voltage measurement of a two-dimensional region with the two-dimensional new impulse response; and
  calculating a derivative of a new apparent resistivity and finding a peak to determine the location of the one or more bed boundaries.

16. The method of claim 15, wherein an information handling system is configured to display the location of the bed boundary.

17. The method of claim 14, further comprising displaying the one or more bed boundaries and wherein an operator makes a production decision based on the one or more bed boundaries.

18. The method of claim 17, further comprising producing a formation data product comprising the one or more bed boundaries.

19. The method of claim 18, further comprising storing the formation data product on a tangible, non-volatile computer-readable medium.

20. The method of claim 1, further comprising extracting the two-dimensional modeled impulse response from a computed vertical response and an azimuthal response.

* * * * *